US006711966B2

United States Patent
Chuang

(10) Patent No.: US 6,711,966 B2
(45) Date of Patent: Mar. 30, 2004

(54) ACCESSORY-MOUNTING DEVICE FOR A BICYCLE

(76) Inventor: Louis Chuang, 7F-8, No. 20, Ta Lon Road, Taichung (TW)

( * ) Notice: Subject to any disclaimer, the term of this patent is extended or adjusted under 35 U.S.C. 154(b) by 16 days.

(21) Appl. No.: 10/057,714

(22) Filed: Jan. 25, 2002

(65) Prior Publication Data

US 2003/0140727 A1 Jul. 31, 2003

(51) Int. Cl.[7] ............................................. B62K 21/12
(52) U.S. Cl. ...................... 74/551.8; 74/548; 403/308
(58) Field of Search ............................ 74/551.8, 548, 74/551, 551.1, 543; 403/308, 384, 387

(56) References Cited

U.S. PATENT DOCUMENTS

| | | | | |
|---|---|---|---|---|
| 2,192,256 A | * | 3/1940 | Kraeft ......................... 222/245 |
| 3,810,559 A | * | 5/1974 | Stanton ....................... 224/447 |
| 4,489,307 A | * | 12/1984 | Nagano ........................ 340/432 |
| 4,653,768 A | * | 3/1987 | Keys et al. .................. 280/279 |
| 5,085,063 A | * | 2/1992 | Van Dyke et al. ............ 70/218 |
| 5,226,340 A | * | 7/1993 | Takeda ....................... 74/551.8 |
| 5,332,183 A | * | 7/1994 | Kagayama ............. 248/222.13 |
| 5,442,973 A | * | 8/1995 | Liao ........................... 74/551.1 |
| 5,492,033 A | * | 2/1996 | Hopey ........................ 74/551.1 |
| 5,562,359 A | * | 10/1996 | Marui ......................... 403/378 |
| 5,680,798 A | * | 10/1997 | Luen .......................... 74/551.1 |
| 6,220,398 B1 | * | 4/2001 | Wu ........................... 188/24.11 |

FOREIGN PATENT DOCUMENTS

EP        431243 A1 *  6/1991  .......... G01P/3/489

* cited by examiner

Primary Examiner—David A. Bucci
Assistant Examiner—Timothy McAnulty
(74) Attorney, Agent, or Firm—Alan Kamrath

(57) ABSTRACT

A bicycle attachment assembly comprises a handlebar stem, an end cap attached to an upper end of the handlebar stem, and an accessory-mounting device having a first end securely, releasably attached to the end cap and a second end to which an accessory is releasably attached. In another embodiment, the bicycle attachment assembly comprises a handlebar stem, an end cap attached to an upper end of the handlebar stem, and at least one accessory releasably attached to at least one mounting portion of the end cap. In a further embodiment, the bicycle attachment assembly comprises a handlebar stem, an end cap including a closing portion securely attached to the upper end of the handlebar stem for closing an upper end of the handlebar stem, the end cap further including an engaging portion formed on top of the closing portion, and an accessory releasably attached to the engaging portion.

10 Claims, 11 Drawing Sheets

ACCESSORY-MOUNTING DEVICE FOR A BICYCLE

BACKGROUND OF THE INVENTION

1. Field of the Invention

The present invention relates to an accessory-mounting device for a bicycle to allow easy, convenient attachment/detachment of an accessory such as a speed meter, a cellular phone bag, or a headlamp unit to/from a handlebar stem of the bicycle. In particular, the present invention relates to a bicycle attachment assembly using an accessory-mounting device to allow easy, convenient attachment/detachment of an accessory to/from a handlebar stem of the bicycle.

2. Description of the Related Art

FIGS. 1 and 2 of the drawings illustrate a conventional arrangement for a handlebar stem 2 and a handlebar 4. The handlebar stem 2 extends upright in a head tube 1 with an upper end of the former extending beyond the latter. An upper bearing 201 is mounted to the upper end of the head tube 1 for rotatably holding the upper end of the handlebar stem 2, and a sleeve 202 is mounted around the upper bearing 201. A lower bearing 203 is mounted to a lower end of the head tube 1 for rotatably holding a lower end of the handlebar stem 2. A connecting member 3 includes a first end to which the handlebar 4 is attached and a second end having a clamping portion 301 with a slit 302. The clamping portion 301 is mounted to and thus clamps the upper end of the handlebar stem 2. Bolts 305 are provided to adjust the tightness of the clamping portion 301. A star-shaped nut 5 is force-fitted to an inner periphery of the handlebar stem 2 and includes a screw hole 501. An end cap 6 is mounted to close the upper end of the handlebar stem 2, and a bolt 7 is extended through a stepped hole 601 of the end cap 6 and the screw hole 501 of the star-shaped nut 5.

When it is desired to attach an accessory such as a cellular phone bag 8 to the handlebar 4, a mounting device 303 is attached to the handlebar 4 by a strap 304, and an engaging member 801 of the cellular phone bag 8 is then engaged with the mounting device 303. However, the cellular phone bag 8 could fall if the strap 304 is not tightened to a certain extent. In addition, it would require different mounting devices for mounting different accessories such as a speed meter and a headlamp unit to the handlebar 4.

The present invention is intended to provide a single mounting device to allow easy, convenient attachment/detachment of different accessories to/from the handlebar stem.

SUMMARY OF THE INVENTION

It is, therefore, an object of the present invention to provide a bicycle attachment assembly using an accessory-mounting device to allow easy, convenient attachment/detachment of an accessory to/from a handlebar stem of the bicycle.

In accordance with a first aspect of the invention, a bicycle attachment assembly comprises a handlebar stem having an upper end, an end cap attached to the upper end of the handlebar stem, and an accessory-mounting device having a first end securely, releasably attached to the end cap and a second end to which an accessory is releasably attached.

In accordance with a second aspect of the invention, a bicycle attachment assembly comprises a handlebar stem having an upper end, an end cap attached to the upper end of the handlebar stem, the end cap including at least one mounting portion, and at least one accessory releasably attached to said at least one mounting portion of the end cap.

In accordance with a third aspect of the invention, a bicycle attachment assembly comprises a handlebar stem having an upper end, an end cap including a closing portion securely attached to the upper end of the handlebar stem for closing the upper end of the handlebar stem, the end cap further including an engaging portion formed on top of the closing portion, and an accessory releasably attached to the engaging portion of the end cap.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
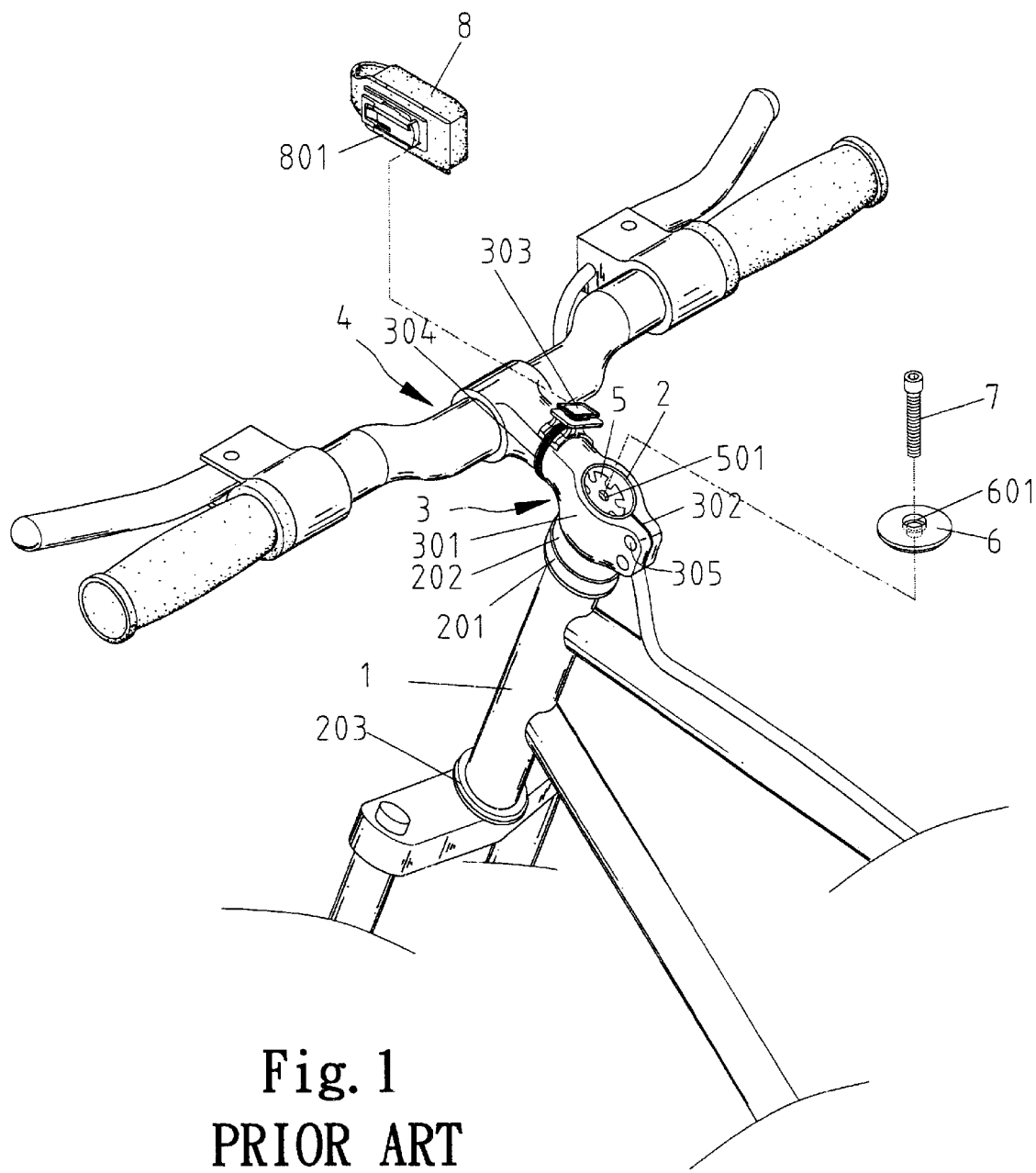
FIG. 1 is a perspective view illustrating a conventional arrangement of a handlebar stem, a handlebar, and an accessory-mounting device for mounting a cellular phone bag.
Figure 2:
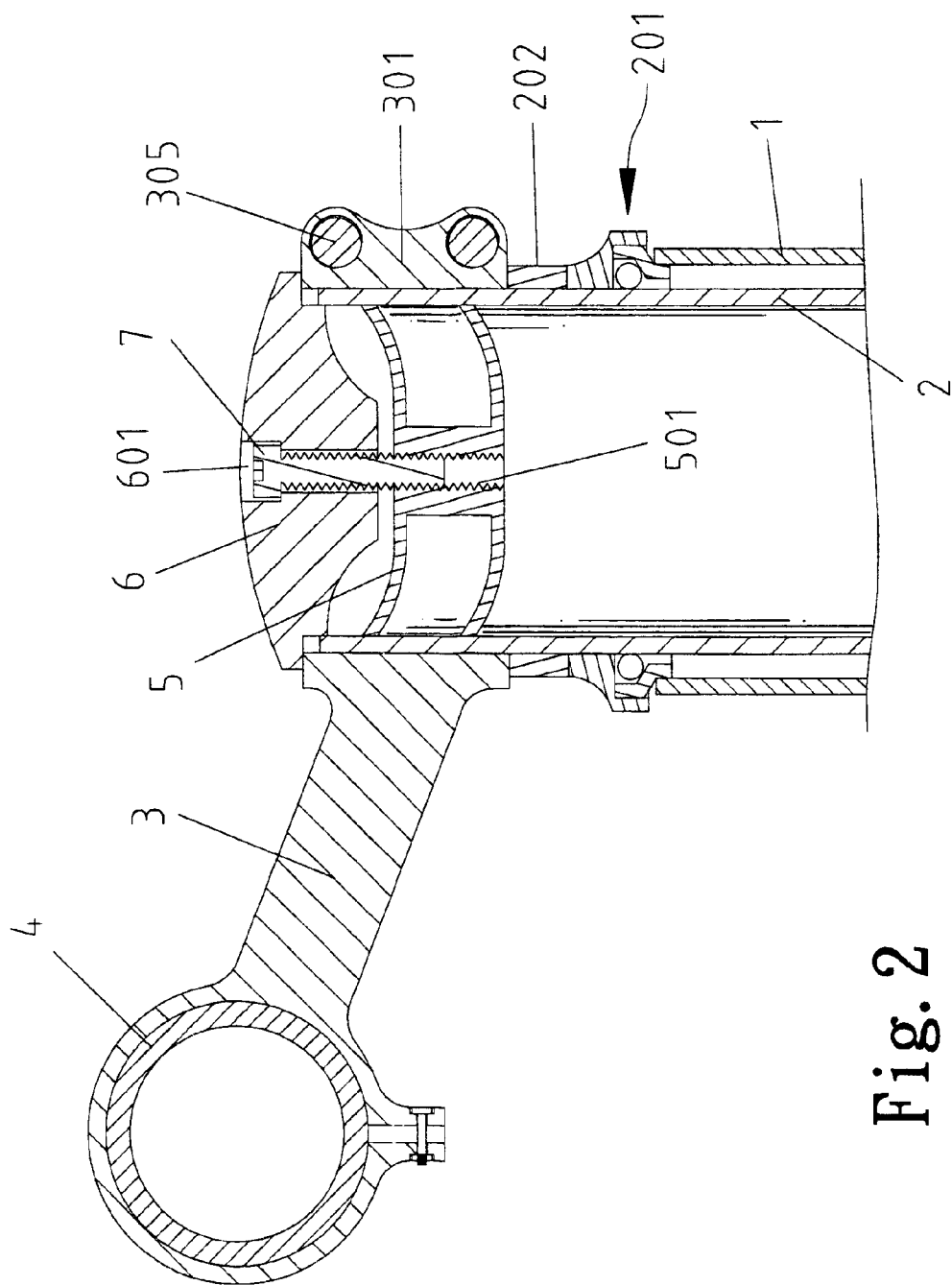
FIG. 2 is a sectional view of the conventional arrangement in FIG. 1.
Figure 3:
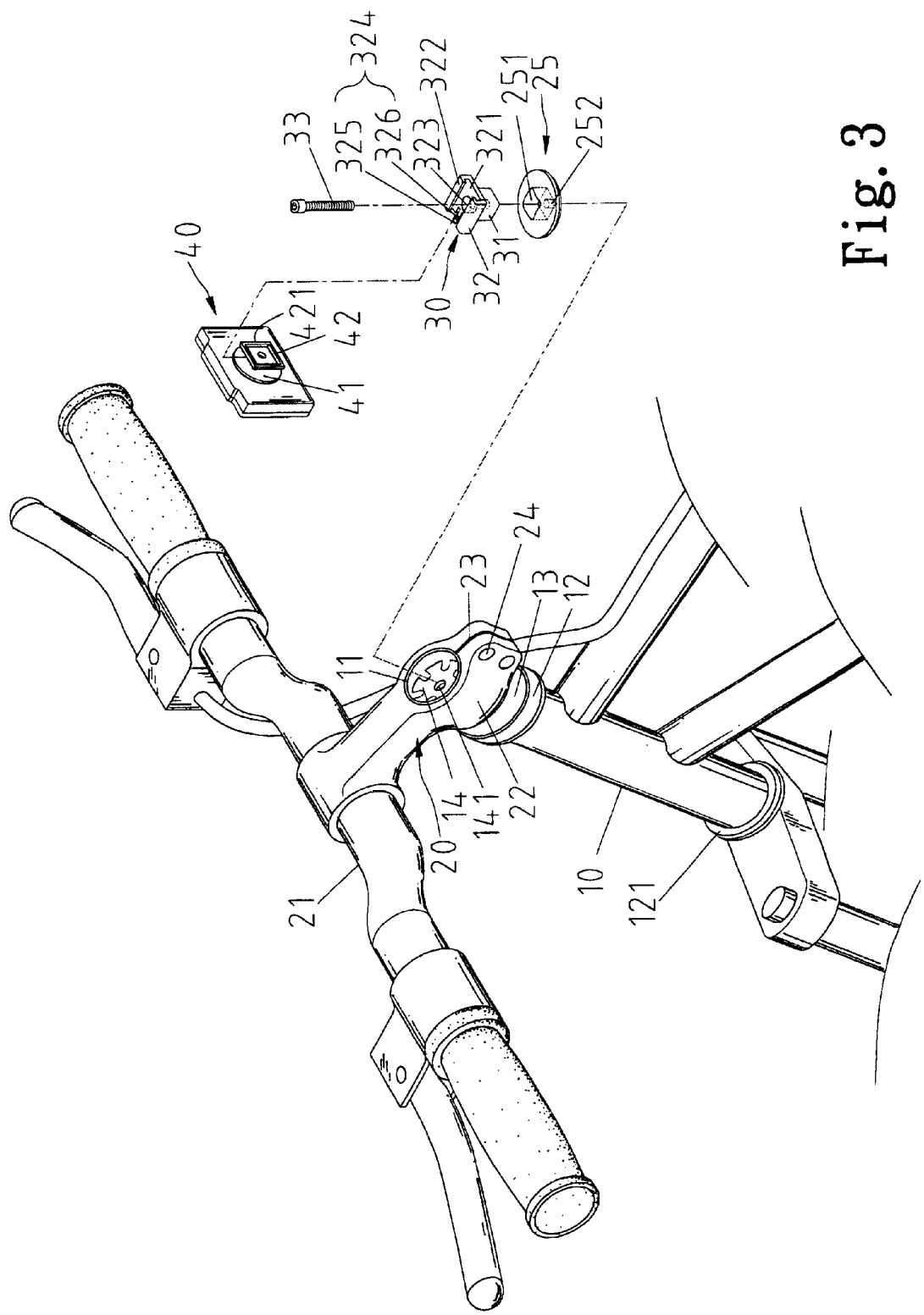
FIG. 3 is a perspective view illustrating an accessory-mounting device and a portion of a bicycle.
Figure 4:
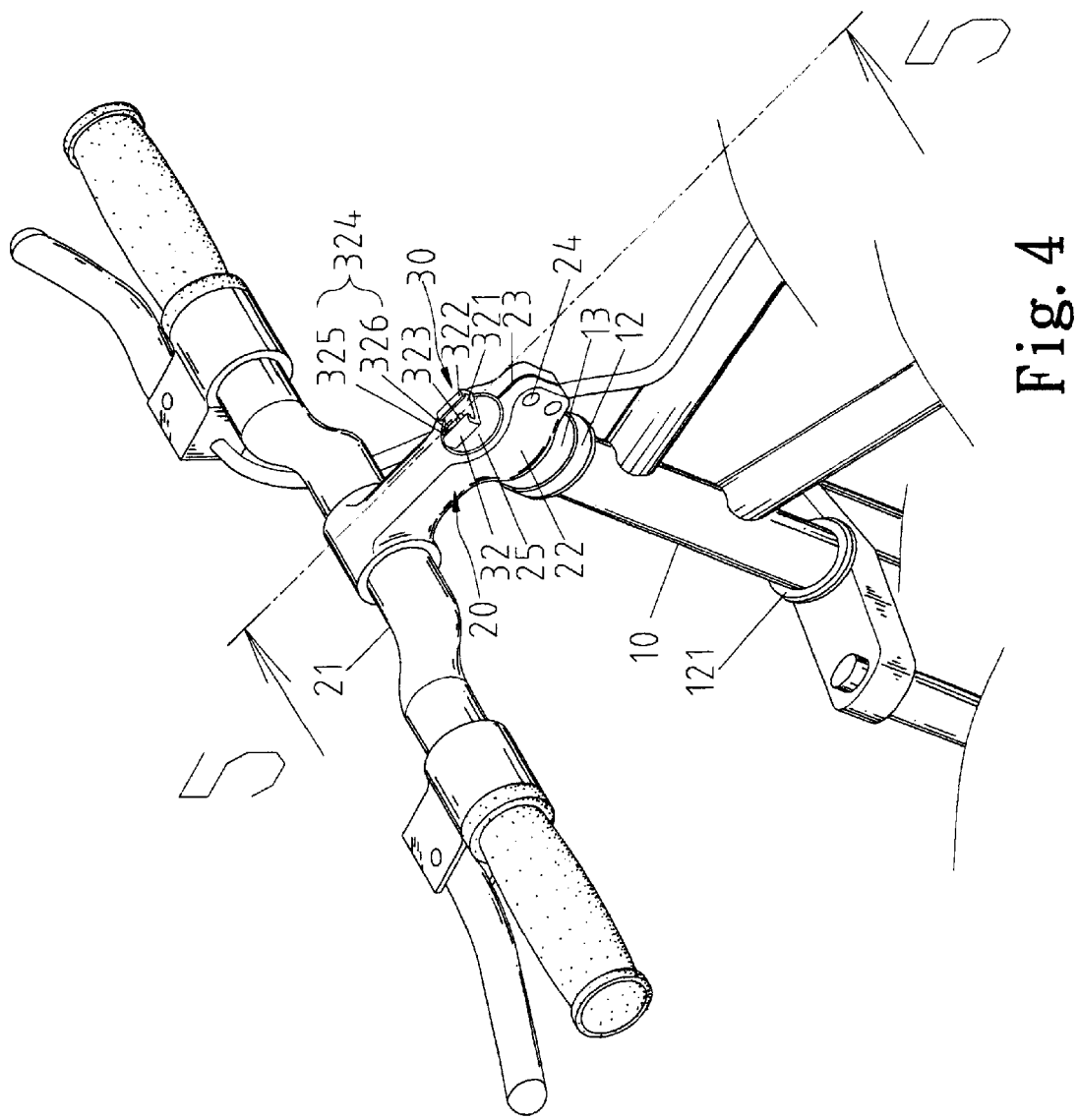
FIG. 4 is a perspective view of the bicycle in FIG. 3, wherein a speed meter in FIG. 3 is removed for clarity.
Figure 5:
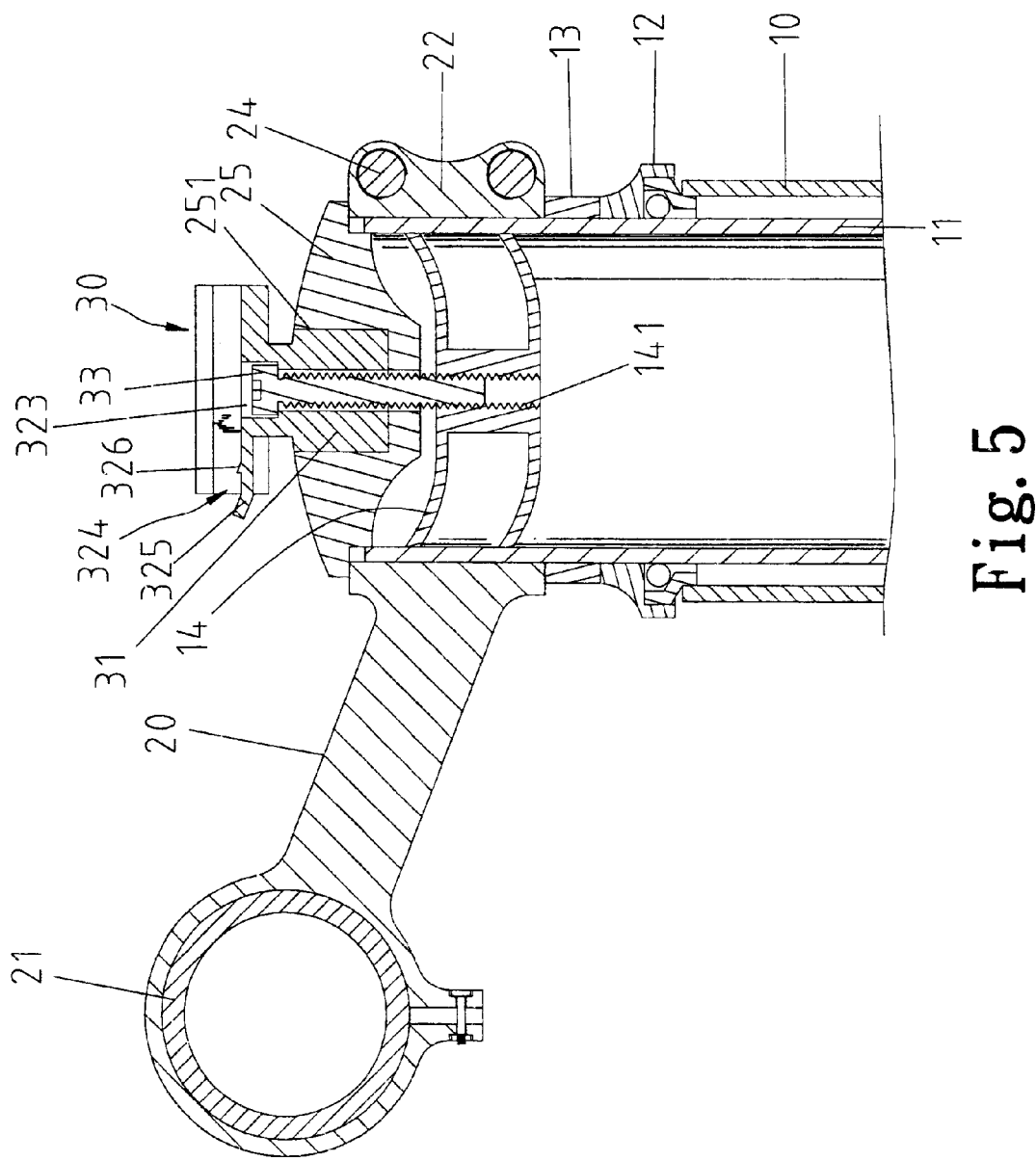
FIG. 5 is a sectional view taken along plane 5—5 in FIG. 4.

Referring to FIGS. 3 through 5, a bicycle generally comprises a head tube 10, a handlebar stem 11, and a handlebar 21. The handlebar stem 11 extends upright in a head tube 10 with an upper end of the former extending beyond the latter. An upper bearing 12 is mounted to the upper end of the head tube 10 for rotatably holding the upper end of the handlebar stein 11, and a sleeve 13 is mounted around the upper bearing 12. A lower bearing 121 is mounted to a lower end of the head tube 10 for rotatably holding a lower end of the handlebar stem 11. A connecting member 20 includes a first end to which the handlebar 21 is attached and a second end having a clamping portion 22 with a slit 23. The clamping portion 22 is mounted to and thus clamps the upper end of the handlebar stem 11. Bolts 24 are provided to adjust the tightness of the clamping portion 22. A star-shaped nut 14 is force-fitted to an inner periphery of the handlebar stem 11 and includes a screw hole 141. An end cap 25 is mounted to close the upper end of the handlebar stem 11 and includes a non-circular hole 251 (square in this embodiment). The end cap 25 further includes a hole 252 communicated with the non-circular hole 251.

Figure 6:
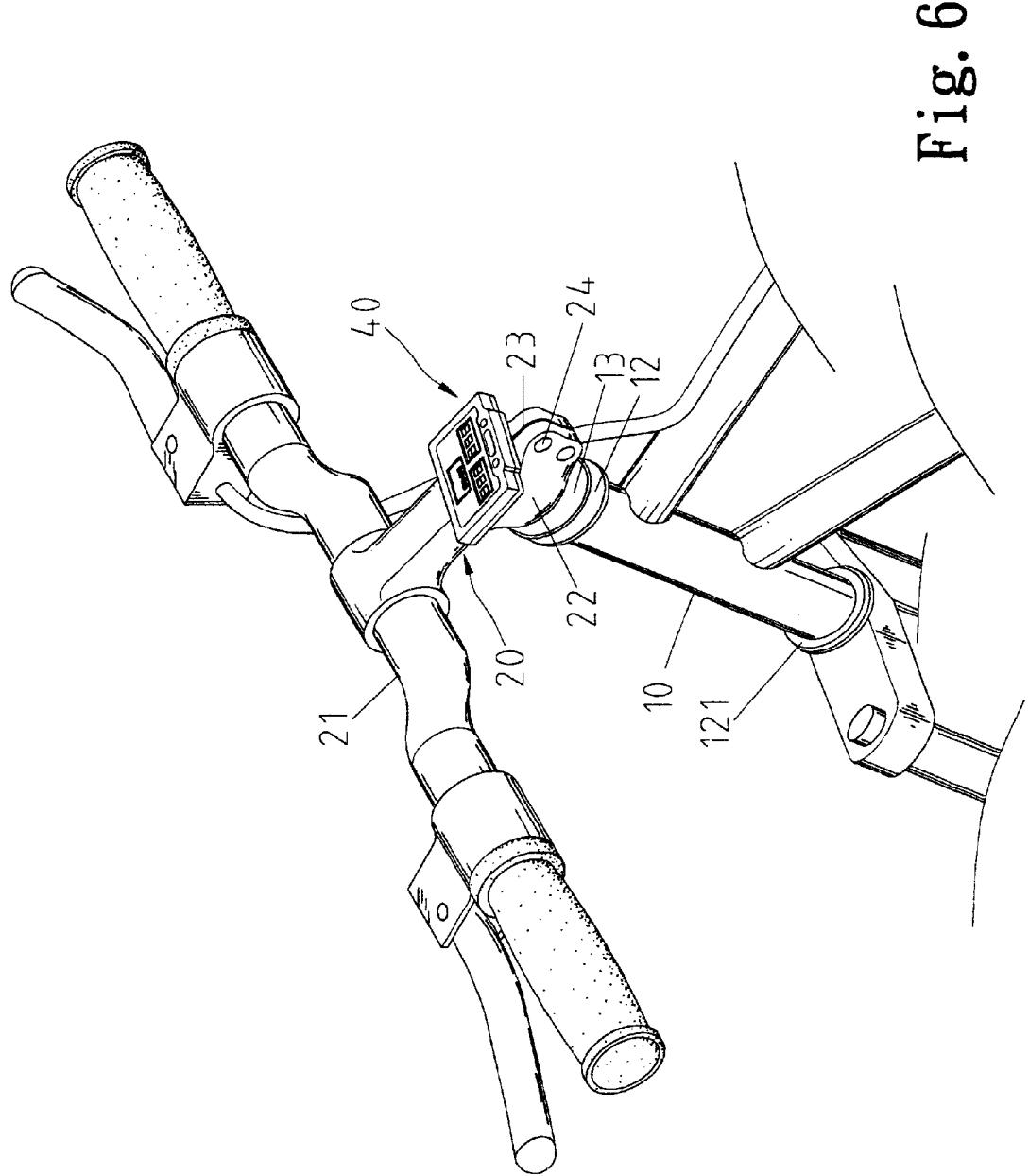
FIG. 6 is a perspective view of the bicycle in FIG. 3.

An accessory-mounting device 30 is securely mounted on top of the end cap 25 and includes an engaging portion 31 and a mounting portion 32. The engaging portion 31 is received in the non-circular hole 251 of the end cap 25, thereby preventing relative rotation between the end cap 25 and the engaging portion 31, best shown in FIG. 7. The mounting portion 32 includes a hole 323 (stepped hole in this embodiment) that is aligned with the hole 252 of the end cap 25. The mounting portion 32 includes a track 321 for sliding engagement with an engaging member 42 of an engaging seat 41 of an accessory (e.g., a speed meter 40). A bolt 33 is extended through the hole 323 of the accessory-mounting device 30, the hole 252 of the end cap 25, and the screw hole 141 of the star-shaped nut 14, as shown in FIGS. 4 and 5. Thus, the user may releasably attach the accessory-mounting device 30 to the end cap 25 by the bolt 33, and an accessory (e.g., a speed meter 40) can be releasably attached to the accessory-mounting device 30. The attachment/detachment of the accessory can be accomplished in a simple, easy, convenient manner without the risk of falling of the accessory, as shown in FIG. 6.

Figure 7:
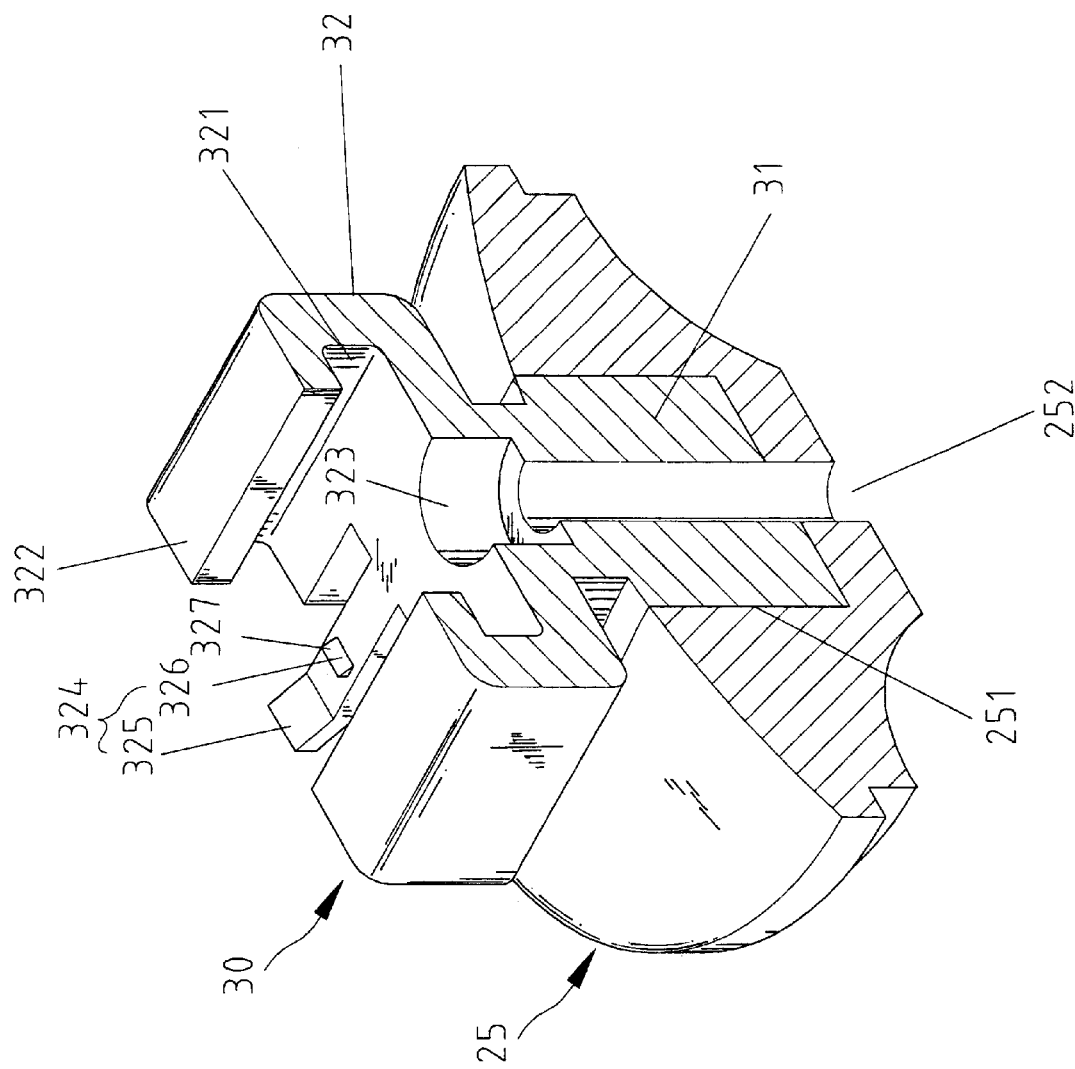
FIG. 7 is an enlarged perspective view, partly cutaway, illustrating detailed structure of the accessory-mounting device and an end cap.

FIG. 7 illustrates detailed structure of the accessory-mounting device 30. The mounting portion 32 of the accessory-mounting device 30 includes a track 321 with two guide edges 322. The mounting portion 32 further includes a resilient tongue 324 having a release end 325 and a limiting block 326 having an inclined face 327 facing away from the release end 325. The engaging member 42 slides along the track 321 until a peripheral edge 421 (FIG. 3) of the engaging member 42 moves across the inclined face 327 of the limiting block 326. Thus, the engaging member 42 is securely retained in place by the limiting block 326 unless the release end 325 of the resilient tongue 324 is pressed. Namely, the user may press the release end 325 and then disengage the accessory (e.g., a speed meter 40) from the mounting portion 32.

Figure 8:
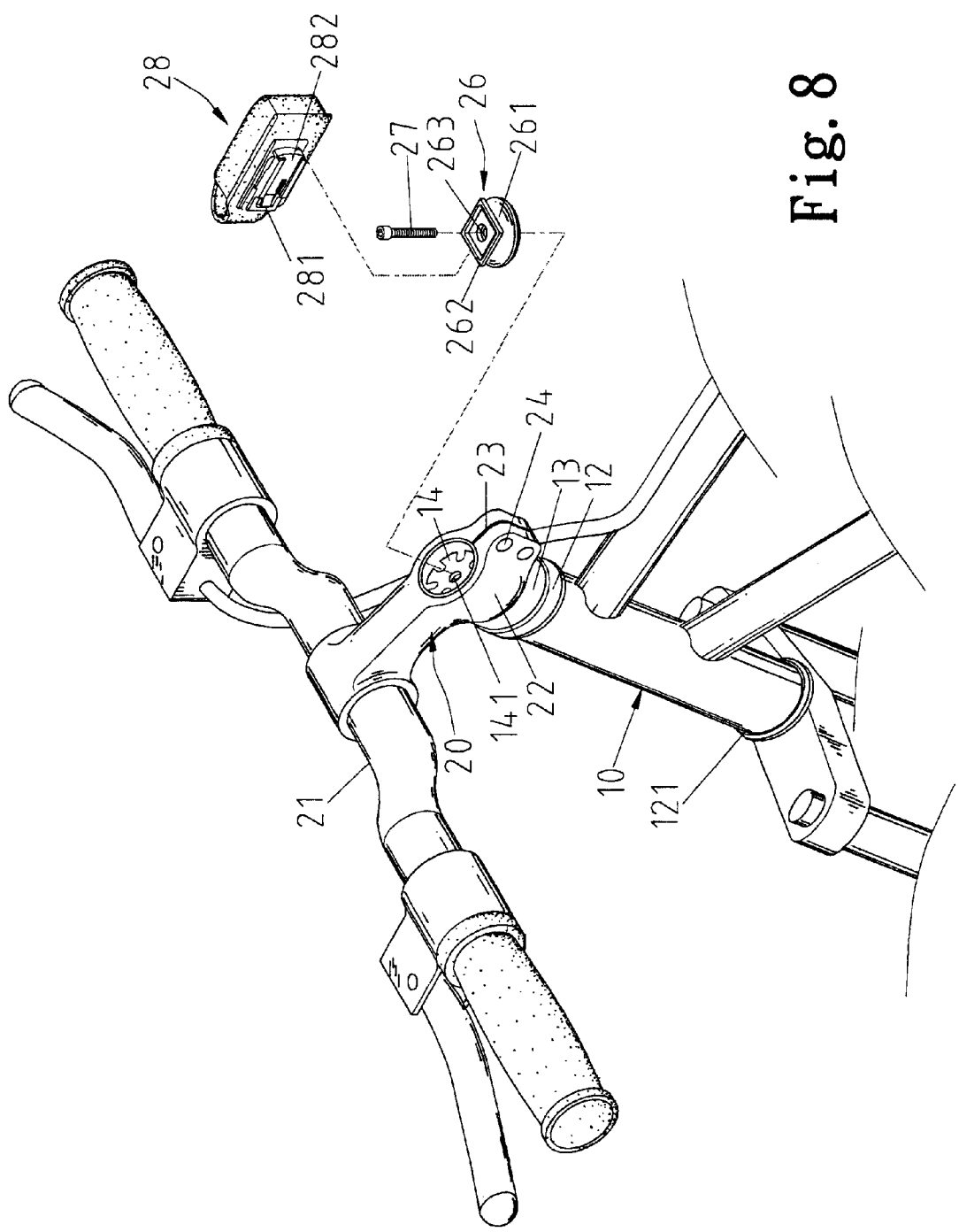
FIG. 8 is a view similar to FIG. 3, illustrating a modified embodiment for attachment of a cellular phone bag.

FIG. 8 illustrates attachment of a cellular phone bag 28 to an accessory-mounting device 30, which, in turn, is securely attached to the upper end of the handlebar stem 11. In this embodiment, the accessory-mounting device 30 is in the form of an end cap 25 comprising a closing portion 261 and a square engaging portion 262 Conned on top of the closing portion 261. A stepped hole 263 extends trough the closing portion 261 and the square engaging portion 262. The closing portion 261 closes the upper end of the handlebar stem 11. A bolt 27 is extended through the stepped hole 263 of the end cap 26 into the screw hole 141 of the star-shaped nut 14. Thus, the accessory-mounting device 30 in the form of an end cap 26 is securely attached to the upper end of the handlebar stem 11, and the cellular phone bag 28 can be attached to the end cap 26 by means of engaging an engaging member 281 of the cellular phone bag 28 with the square engaging portion 262. In this embodiment, the cellular phone bag 28 includes an engaging member 281 defining a track 282. The square engaging portion 262 is in sliding engagement with the track 282. The engaging member 281 further includes a resilient tongue 324 having a release end 325 and a limiting block 326 having an inclined face 327 facing away from the release end 325. The resilient tongue 324, the release end 325, and the limiting block 326 are identical to those of the embodiment of FIG. 7. Thus, the engaging member 281 slides relative to the square engaging portion 262 until a peripheral edge (not labeled) of the square engaging portion 262 moves across the inclined face 327 of the limiting block 326 to thereby securely retain the cellular phone bag 28 in place by the limiting block 326 unless the release end 325 of the resilient tongue 324 is pressed.

Figure 9:
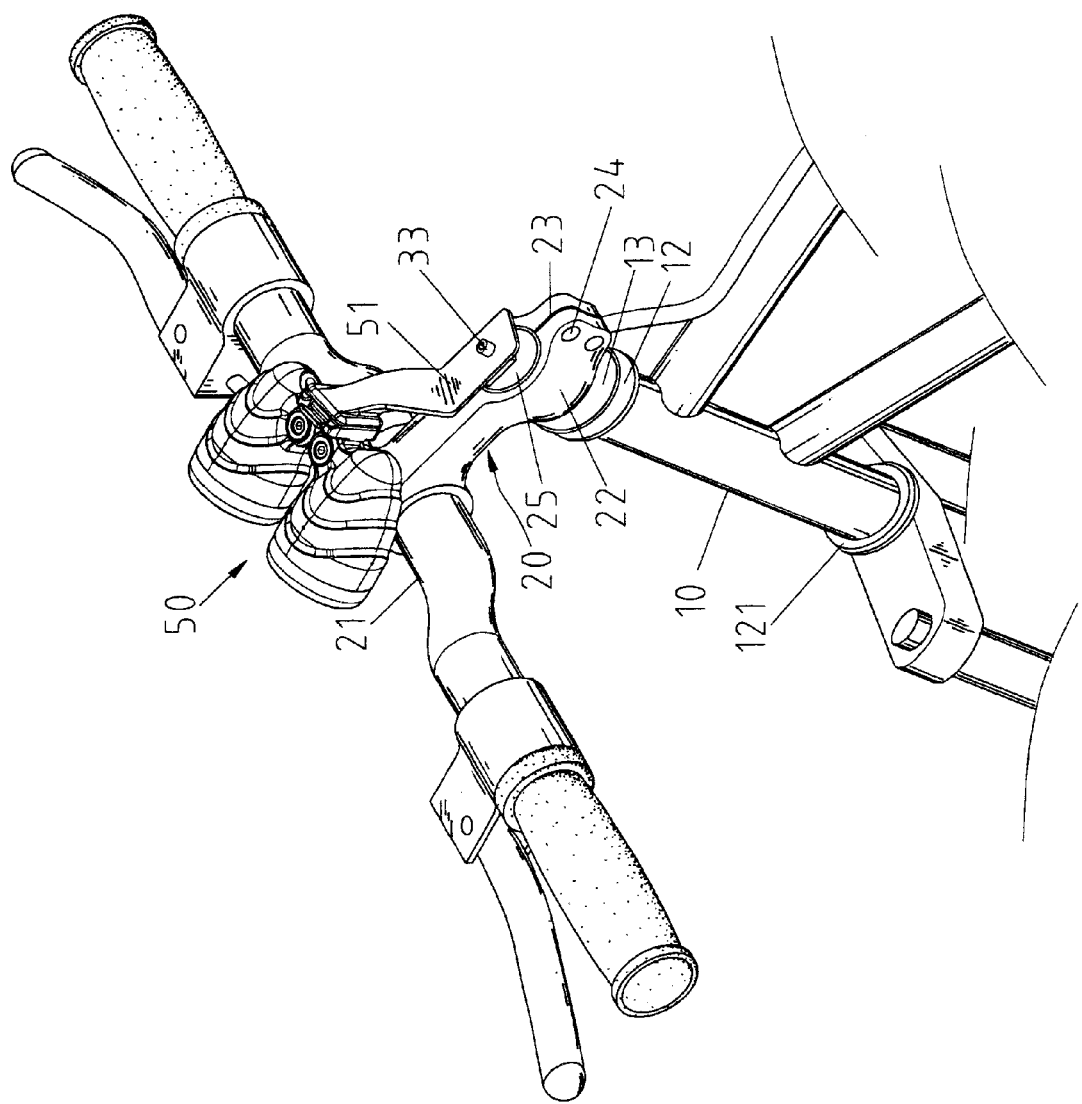
FIG. 9 is a view similar to FIG. 6, illustrating another modified embodiment for attachment of a headlamp unit.

FIG. 9 illustrates attachment of a headlamp unit 50 to the end cap 25. A bolt 33 is extended through an engaging portion 51 of the headlamp unit 50, the hole 252 (FIG. 3) of the end cap 26, and the screw hole 141 of the star-shaped nut 14. Thus, the headlamp unit 50 can be mounted to the handlebar stem 11 without the need of other tools or members.

Figure 10:
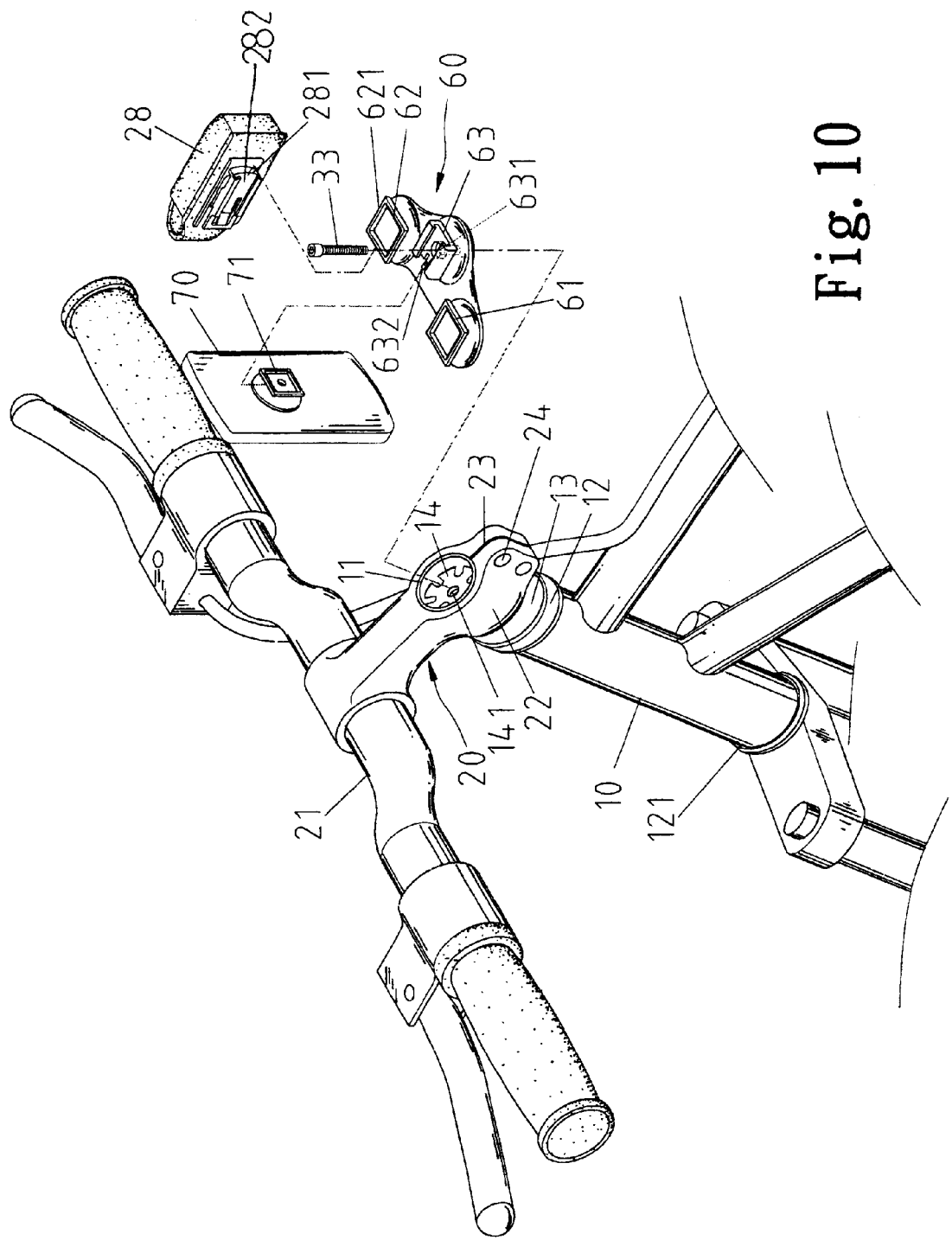
FIG. 10 is a view similar to FIG. 3, illustrating a further modified embodiment of the accessory-mounting device in accordance with the present invention.
Figure 11:
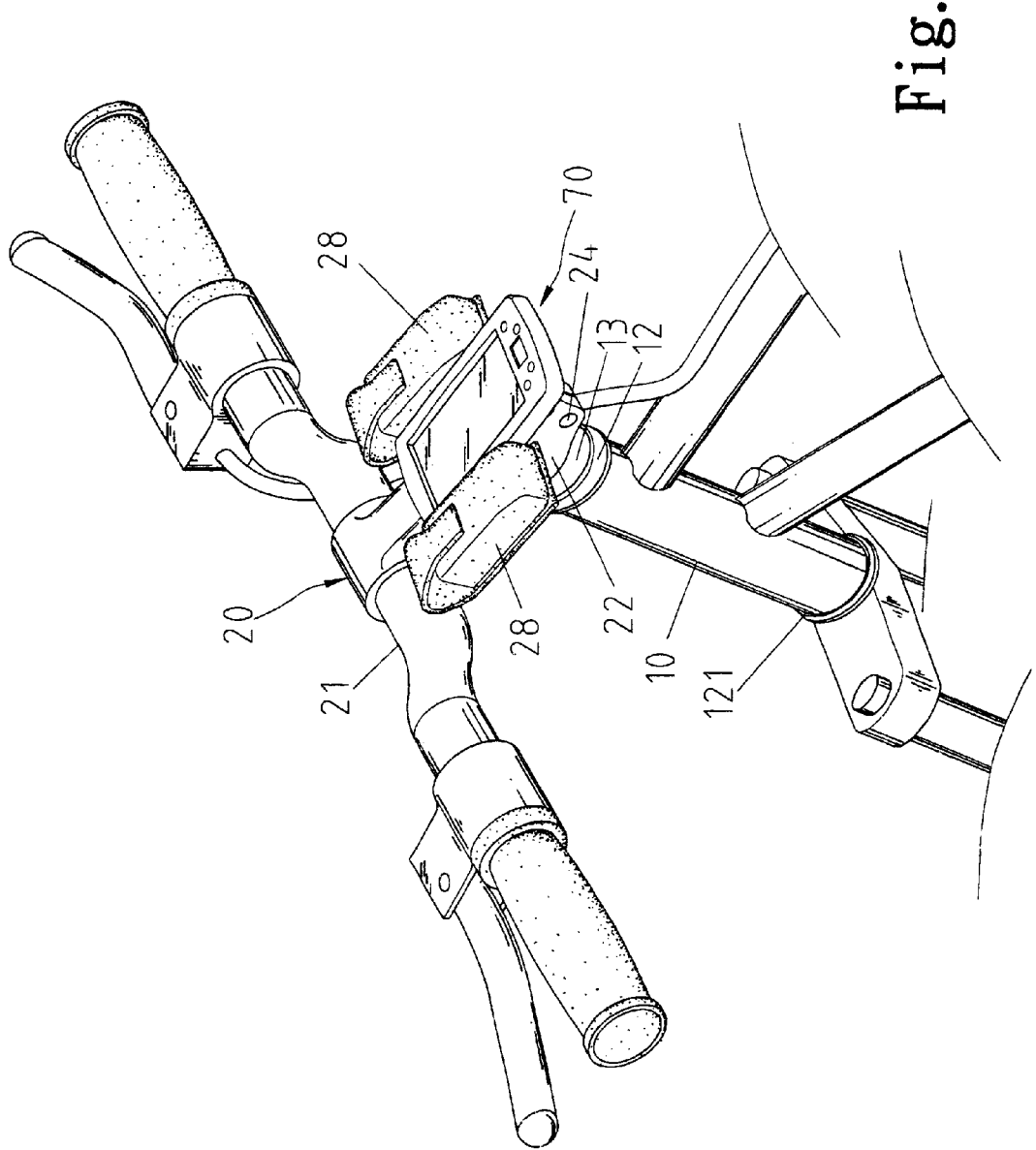
FIG. 11 is a perspective view of the modified embodiment of FIG. 10.

FIGS. 10 and 11 illustrates a further modified embodiment, wherein the end cap (now designated by 60) includes plural mounting portions 61, 62, and 63 on an upper side thereof. The mounting portions 61 and 62 allow attachment of cellular phone bags 28. In this embodiment, the cellular phone bag 28 includes an engaging member 281 defining a track 282. The mounting portions 61 and 62 include a peripheral edge 621 for sliding engagement with the track 282. The engaging member 281 further includes a resilient tongue 630 having a release end 325 and a limiting block 326 having an inclined face 327 facing away from the release end 325. The resilient tongue 632, the release end 325, and the limiting block 326 in this embodiment are identical to those of the embodiment of FIG. 7. Thus, the engaging member 281 slides relative to the mounting portions 61 and 62 until the peripheral edge 621 moves across the inclined face 327 of the limiting block 326 to thereby securely retain the cellular phone bag 28 in place byte limiting block 326 unless the release end 325 of the resilient tongue 632 is pressed.

The mounting portion 63 allows attachment of a personal digital assistant (FDA) 70. The PDA 70 includes an engaging member 71 for releasable engagement with a resilient tongue 632 (see FIG. 7) of the mounting portion 63. A hole 631 is defined in the mounting portion 63, and a bolt 33 is extended through the hole 631 into the screw hole 141 of the star-shaped nut 14 for securely mounting the end cap 60 to the upper end of the handlebar stem 11.

According to the above description, it is appreciated that the present invention provides a bicycle attachment assembly using an accessory-mounting device to allow easy, convenient attachment/detachment of an accessory to/from a handlebar stem of the bicycle.

Although the invention has been explained in relation to its preferred embodiment, it is to be understood that many other possible modifications and variations can be made without departing from the scope of the invention as hereinafter claimed.

What is claimed is:

1. A bicycle accessory assembly comprising:
   a handlebar stem having an upper end, wherein the handlebar stem is adapted to be rotatably received within a head tube of a bicycle, wherein the handlebar stem further defines a passageway adapted to be within the head tube;
   an end cap attached to the upper end of the handlebar stem, wherein attachment of the end cap to the handlebar stem encloses the passageway and restricts motion of the handlebar stem with respect to the head tube along a common axis;
   an accessory-mounting device having a first end and a second end, with the first end non-rotationally attached to the end cap; and
   at least one accessory, wherein the second end provides for detachment and reattachment of the at least one accessory, wherein the second end of the accessory-mounting device includes at least one mounting portion, and the at least one accessory includes an engaging member for releasable engagement with the at least one mounting portion wherein the at least one mounting portion of the accessory-mounting device includes a flat configuration, and the engaging member of the at least one accessory includes a track for sliding engagement with the at least one mounting portion of the accessory-mounting device.

2. The bicycle accessory assembly according to claim 1, wherein the track of the engaging member of the at least one accessory includes two guide edges for sliding engagement with the at least one mounting portion of the accessory-mounting device.

3. The bicycle accessory assembly according to claim 2, wherein the engaging member of the at least one accessory includes a resilient tongue with a release end and a limiting block with an inclined face facing away from the release end, and the at least one mounting portion of the accessory-mounting device can be moved on the inclined face of the limiting block of the engaging member of the at least one accessory so that the at least one mounting portion of the accessory-mounting device can be moved past the limiting block of the engaging member of the at least one accessory and kept in position unless the release end of the resilient tongue is pressed.

4. A bicycle accessory assembly comprising:
a handlebar stem having an upper end, wherein the handlebar stem is adapted to be rotatably received within a head tube of a bicycle, wherein the handlebar stem further defines a passageway adapted to be within the head tube;
an end cap attached to the upper end of the handlebar stem, wherein attachment of the end cap to the handlebar stem encloses the passageway and restricts motion of the handlebar stem with respect to the head tube along a common axis;
an accessory-mounting device having a first end and a second end, with the first end non-rotationally attached to the end cap; and
at least one accessory, wherein tine second end provides for detachment and reattachment of the at least one accessory, wherein the second end of the accessory-mounting device includes at least one mounting portion, and the at least one accessory includes an engaging member for releasable engagement with the at least one mounting portion, wherein to engaging member of the at least one accessory includes a flat configuration, and the at least one mounting portion of the accessory-mounting device includes a track for sliding engagement with the engaging member of the at least one accessory.

5. The bicycle accessory assembly as claimed in claim 4, wherein the end cap includes a polygonal hole, and the first end of the accessory-mounting device has a polygonal engaging portion inserted in the polygonal hole.

6. The bicycle accessory assembly according to claim 4 wherein the end cap and the accessory-mounting device comprise an integrally formed, single, inseparable piece.

7. The bicycle accessory assembly according to claim 4, wherein the track of the at least one mounting portion of the accessory-mounting device includes two guide edges for sliding engagement with the engaging member of the at least one accessory.

8. The bicycle accessory assembly according to claim 7, wherein the at least one mounting portion of the accessory-mounting device includes a resilient tongue with a release end and a limiting block with an inclined face facing away from the release end, and the engaging member of the at least one accessory can be moved on the inclined face of the limiting block of the at least one mounting portion of the accessory-mounting device so that the engaging member of the at least one accessory can be moved past the limiting block of the at least one mounting portion of the accessory-mounting device and kept in position unless the release end of the resilient tongue is pressed.

9. The bicycle accessory assembly according to claim 4 including more than one accessory, wherein the accessory-mounting device includes more than one mounting portion for sliding engagement with the accessories.

10. The bicycle accessory assembly according to claim 4, wherein the end cap is coaxial with the handle bar stem.

* * * * *